April 16, 1968   H. MULCH   3,377,917
MAGAZINE SLIDE PROJECTOR
Filed July 25, 1966   3 Sheets-Sheet 3

INVENTOR
HANS MULCH
BY
Krafft & Wells
ATTORNEYS

United States Patent Office 3,377,917
Patented Apr. 16, 1968

3,377,917
MAGAZINE SLIDE PROJECTOR
Hans Mulch, Wetzlar, Germany, assignor to Ernst Leitz, G.m.b.H., Wetzlar, Germany
Filed July 25, 1966, Ser. No. 567,710
Claims priority, application Germany, Aug. 13, 1965, L 51,372
8 Claims. (Cl. 88—28)

ABSTRACT OF THE DISCLOSURE

This invention relates generally to slide projectors and particularly to slide projectors having improved means for successively projecting a number of slides onto a screen in combination with means for fine focusing the slides located in position for projection.

In a particular embodiment of the present invention, a releasable connection is provided between the means for fine-focusing the slide and the slide platform having the slide changer guided thereon. Also additional means is provided for shifting the slide platform and the slide changer in the direction of the optic axis in response to the slide changing movement. This is done in such a manner that independently of the fine-focusing adjustment, the platform and changer while in position for magazine advancement will be uncoupled (disengaged) from the fine-focusing mechanism, actuated while in this position for the removal of a slide from or its return to the magazine, and then, while in position for projection, returned to the adjusted focusing position. In this manner it is made certain that after projection the slide is returned without difficulty to the same position in the magazine from which it was taken.

The means for focusing can act either upon the slide platform or upon the slide changer. In projectors with a hand-operated slide changer, the latter is preferably itself adapted to serve as part of the controlling means. An especially advantageous arrangement has been a stationary inclined guide along the receding path of the slide changer in such a position that the latter during its back and forth movement shifts in the direction of the optic axis while carrying the slide platform along with it. In order to return the slide platform of its own accord to is original focusing position after such shifting, it is spring-biased in one direction.

In projectors using motor-driven slide changers, the member that actuates the changer is also used to control the disengagement of the slide platform. In a particular embodiment, the crank disk which is connected in a known manner for transporting the slide changer, is provided with cams or notches by means of which the slide platform is disconnected in the desired manner from the fine focusing mechanism. It is also possible to have the rod connecting the means for fine focusing and the slide platform serve as the control member.

Background of the invention

Slide projectors having means for fine focusing the slides located in position for projection are known. Such prior art projectors are disclosed in U.S. Patents 2,298,413, 2,705,438, 3,001,445, 3,013,469, 3,029,692, and 3,120,779, the disclosures of which are incorporated herein. In the prior art projectors a particular object of the use of the means for fine focusing the slides located in position for projection was to compensate for the thickness of the slides.

In addition to the objects disclosed by the prior art the fine adjustment of the slide platform is preferable to fine adjustment of the objective or projection lens because the use of a relatively heavy objective lens has no effect on the mobility of the fine adjusting mechanism. Heretofore the substitution of objective lenses with different focal distances was possible only within limits. Beyond such limits the axial adjustment of the intermediate sleeve that receives the objective lens and which cooperates with the fine focusing mechanism is no longer possible with very heavy objective lenses. Besides the necessity for using an intermediate sleeve for all objective lenses, there has also been the disadvantage of a single sleeve being limited to objective lenses with a single outside diameter. For objective lenses of other dimensions, other sleeves have had to be used.

While the previously suggested methods of fine focusing projectors by adjustment of the slide platform have avoided some of these difficulties, it was found difficult after displacing the slide in the direction of the optic axis to return it, without crowding or jamming, to its original place in the magazine since the position of the magazine compartment has not been changed.

Description of the invention

It is, therefore, an object of the present invention to eliminate the difficulty of the crowding or jamming of slides returned to a magazine after being fine focused in position for projection.

Another object of the present invention is to provide a slide projector which will accommodate slides of different thicknesses.

Still another object of the invention is to provide for fine focusing of slides in projectors having interchangeable sizes of objective lenses.

A particular object of the invention is a slide projector having a releasable connection between the means for fine-focusing the slide and the slide platform.

Still further objects and the broad scope of the invention will become obvious from the following description of the accompanying drawings which illustrate certain preferred embodiments thereof and wherein.

Figure 1:
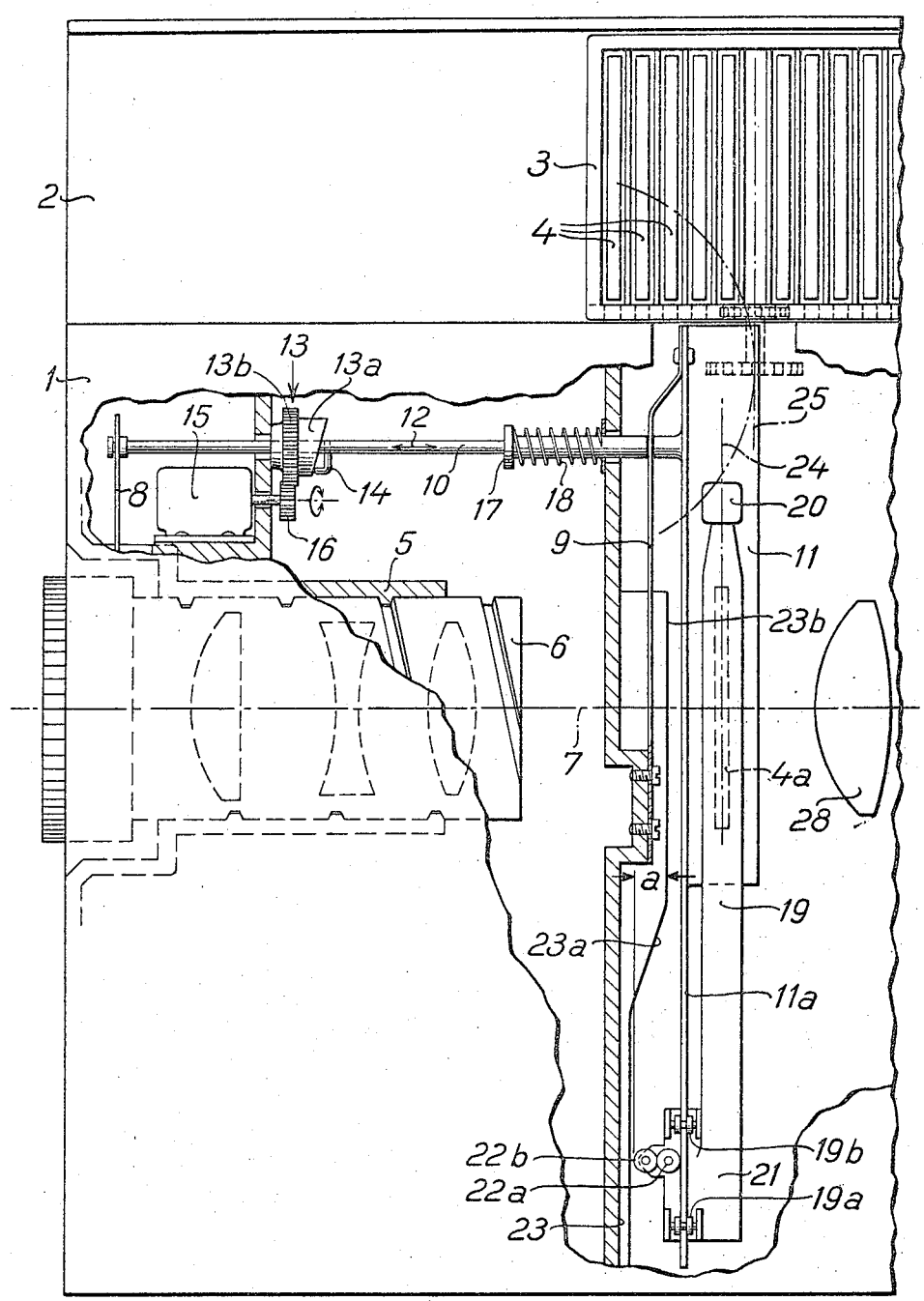
FIGURE 1 shows in sectional plan view a slide projector with a means for fine focusing acting upon the slide platform and a means for disengaging said projector in operative position for projection.
Figure 2:
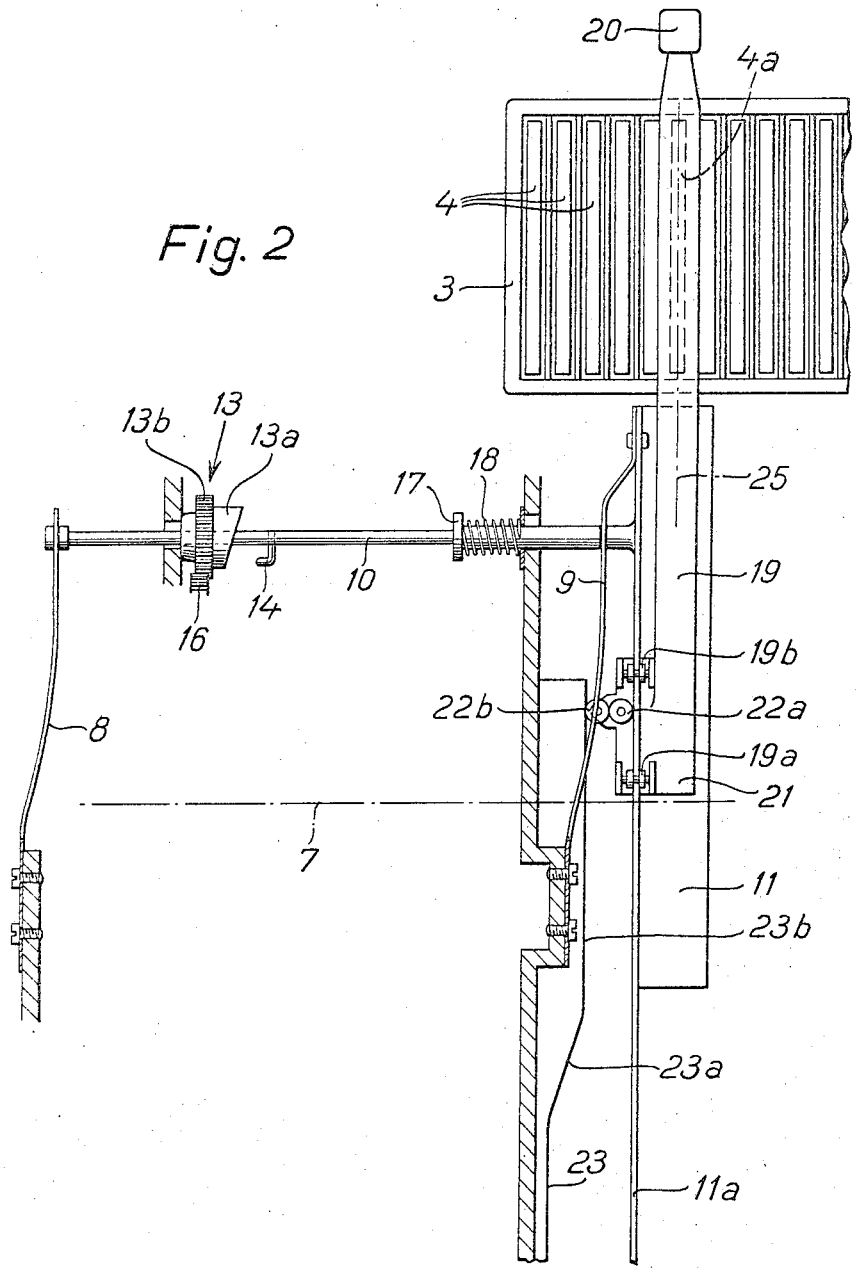
FIGURE 2 shows a portion of the same apparatus after projection.

With particular reference to FIGURE 1, a magazine holder 2 is provided on the base of the projector for receiving a slide magazine 3 having means for holding slides or transparencies. The magazine is moved stepwise in one direction through a distance equal to the thickness of one slide by conventional advancing means such as that shown in U.S. Patent 2,705,438. The stationary guideway 5 is for supporting a projection or objective lens 6 which is initially adjusted by hand in the direction of the optic axis 7. To the base are also fastened two leaf springs 8 and 9 upon which the rod 10 is mounted (FIGS. 1 and 2), and which has secured to one end of it the slide platform 11. The leaf springs are both of the same length and form a parallel movable support for the slide platform which will, therefore, be movable only in the direction of the optic axis (arrow 12). Although the path of such movement is slightly curvilinear, the resulting deviation from rectilinear movement will be negligible.

The lateral displacement of the slide platform 11 is effected by the positioning member 13 rotatably mounted on the rod 10, serving as part of the fine focusing mechanism to adjust the distance between the projection lens 6 and the slide platform 11. The member 13 carries a cam 13a for engaging a shoulder 14 on the rod 10, and also peripheral gear teeth 13b in mesh with pinion 16 driven by a precision motor 15. The rod 10 carries a collar 17 engaged by a spring 18 to keep the shoulder 14 in contact with the inclined surface of the cam 13a.

In an alternative embodiment, in place of the precision motor 15 and means for electrically controlling the motor outside of the housing 1, gearing is provided for adjustment of the cam 13a by hand.

Upon the rail 11a of the slide platform 11 is mounted the slide changer 19 equipped with a handle 20 and supporting rollers 19a, 19b to permit its movement along the rail 11a transversely of the optic axis. The slide changer and the transparency or slide 4a carried by it also necessarily participate in the movement of the slide platform while the roller 22b travels along stationary path 23, a portion 23a of which is inclined. The straight portion 23b serves to keep the slide changer in the correct position relative to the magazine for loading or unloading transparencies.

During its displacement from the projecting position to the magazine, the slide changer together with the slide platform is displaced in the direction of the optic axis while the roller 22b traverses the inclined portion 23a of the path 23. The maximum displacement is designated as $a$ and is somewhat greater than the greatest possible fine focusing adjustment by the cam 13a. The reference plane 23b of the remaining portion of path 23 is so located that when the roller 22b is on this remaining portion, the central plane 24 of the slide changer 19 coincides with the central plane of the magazine compartment being loaded or unloaded.

The source of light comprises lamp 26 with mirror 27 behind and condensing lens 28 in front of it.

Having described the components of the projector, a preferred method of operating the apparatus is given.

After a transparency or slide 4a has been brought by the slide changer 19 from the magazine into position for projection as shown in FIGURE 1, the projection lens 6 is given a coarse adjustment by hand. This coarse adjustment remains the same during all subsequent slide changers. Since, however, the slides are not always in exactly the same position on the slide platform, and may themselves be of varying thicknesses, a fine adjustment of the focusing may be necessary, and for this purpose the mechanism 13–15 is provided.

By energizing the precision motor 15 from outside the housing 1 by an electric control circuit, the cam member 13 is rotated on the rod 10. The rod is thereby moved in the direction of the arrow 12. In this manner the slide platform and with it the slide changer 19 is brought to the correct distance from the objective lens 6 and the proper focus is obtained. At the same time, the central plane 24 of the slide changer experiences thereby a lateral displacement relative to the central plane of the magazine compartment from which the slide was taken. This displacement will, however, be compensated for automatically when the slide changer is returned to its original position adjacent the magazine. This correction is effected by movement of the roller 22b over the inclined portion 23a of the path 23. In this manner the slide changer is brought into correct position for returning the slide to its original compartment in the magazine.

The displacement of the slide platform caused by the fine focusing has no effect on the return movement of the slide changer. With different positions of the cams 13a the roller 22b is then brought into contact with the inclined portion 23a at different points.

During subsequent slide changes the slide changer upon reaching the projection position under the action of spring 18, the function of which, however, can also be performed entirely by leaf springs 8 and 9, jumps back and by way of rod 10 and shoulder 14 is pressed upon the cam 13a of the fine focusing mechanism because the roller 22b, which is then adjacent the incline 23a is disengaged. The slide platform is then in the same position as it occupied after the previous slide change. Another fine focusing may now be necessary depending on the thicknesses of slide and other variables.

Figure 3:
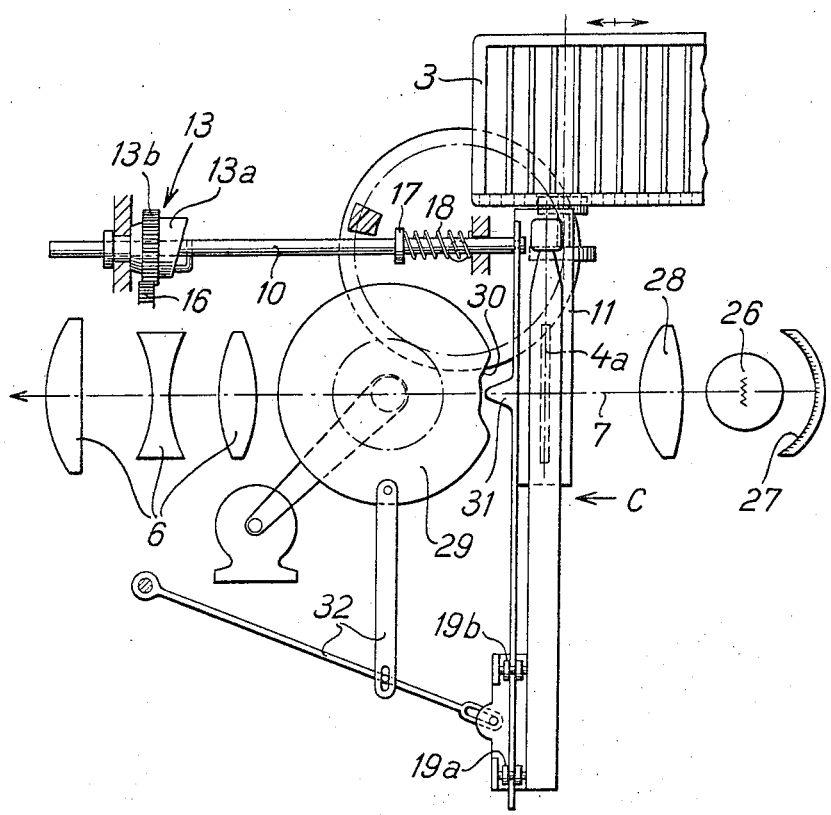
FIGURE 3 shows another embodiment of means for disengaging, all showings being schematic.

A similar apparatus is shown in FIGURE 3 where the fine focusing mechanism operates in a similar manner. The return of the slide platform 11 is controlled here by the periphery of motor driven crank disk 29 whose periphery has a cut-out portion 30 while the slide platform 11 is provided with a projection 31 for contacting the remainder of the periphery of the disk. As soon as the projection enters the cut-out portion, the slide platform jumps back in the direction or the arrow C until the fine focusing mechanism is encountered in the same manner as before.

It will be understood that this invention is susceptible to modification in order to adapt it to different usages and conditions and, accordingly, it is desired to comprehend such modifications within this invention as may fall within the scope of the appended claims.

I claim:

1. A slide projector comprising:
   (a) means providing a path for a light beam;
   (b) a magazine for maintaining a plurality of slides in a position offset from said path;
   (c) means for displacing a slide from said magazine into a projecting position in which said slide is disposed in said path and for returning the same to said magazine;
   (d) means for advancing said magazine after the return of said slide thereinto so that another slide will be engaged by said slide displacing means;
   (e) means for fine focusing a slide in said projecting position engaging said means for displacing, the improvement comprising:
   (f) means for disengaging said means for fine focusing from said means for displacing regardless of the position adjusted by said means for fine focusing whereby a slide is returned to said magazine and is returnable to said projecting position.

2. The apparatus of claim 1, wherein said means for displacing (c) comprises a slide platform (11), a slide changer (19) slidably mounted on said platform and said means for disengaging (22, 23), whereby said slide platform is moved in the direction of said path.

3. The apparatus of claim 2, wherein said means for disengaging comprises a stationary inclined path (23a) extending in the direction of displacement of said slide changer (19), whereby said slide changer and said slide platform are shifted in the direction of said path during displacement of said slide from said magazine and return thereto.

4. The apparatus of claim 2, further comprising means for spring biasing said slide platform.

5. The apparatus of claim 2, further comprising said slide platform mounted on the ends of two parallel leaf springs (8, 9) for movement in the direction of said path.

6. The apparatus of claim 5, wherein said leaf springs are pretensioned whereby said slide platform is biased toward said means for fine focusing.

7. The apparatus of claim 1, further comprising a motor-driven slide changer having a driving means (29), a slide changer (19), a slide platform (11), and controlling means (30) whereby said slide platform is disengaged from said means for fine focusing.

8. The apparatus of claim 7, wherein said driving means is a crank disk having a recessed portion (30) cooperating with a contact member (31) on said slide platform whereby said platform is displaced in the direction of said path.

References Cited

UNITED STATES PATENTS 3,134,298   5/1964   Volkholz _____ 88—28

NORTON ANSHER, *Primary Examiner.*

JOSEPH W. PRICE, *Assistant Examiner.*